US012639411B2

(12) United States Patent
Leuthardt et al.

(10) Patent No.: US 12,639,411 B2
(45) Date of Patent: May 26, 2026

(54) EXPRESSION RECOGNITION IN MESSAGING SYSTEMS

(71) Applicant: FaceToFace Biometrics, Inc., St. Louis, MO (US)

(72) Inventors: Eric Leuthardt, St. Louis, MO (US); Scott Stern, St. Louis, MO (US)

(73) Assignee: FaceToFace Biometrics, Inc., St. Louis, MO (US)

( * ) Notice: Subject to any disclaimer, the term of this patent is extended or adjusted under 35 U.S.C. 154(b) by 0 days.

(21) Appl. No.: 18/581,212

(22) Filed: Feb. 19, 2024

(65) Prior Publication Data

US 2024/0193243 A1     Jun. 13, 2024

Related U.S. Application Data

(63) Continuation of application No. 17/353,270, filed on Jun. 21, 2021, now abandoned, which is a
(Continued)

(51) Int. Cl.
*G06F 21/32* (2013.01)
*G06F 3/00* (2006.01)
(Continued)

(52) U.S. Cl.
CPC ................ *G06F 21/32* (2013.01); *G06F 3/00* (2013.01); *G06F 3/011* (2013.01); *G06F 3/0304* (2013.01);
(Continued)

(58) Field of Classification Search
CPC ......... G06F 21/32; G06F 21/629; H04W 4/21
See application file for complete search history.

(56) References Cited

U.S. PATENT DOCUMENTS 6,836,846 B1     12/2004  Kanevsky et al.
6,873,710 B1      3/2005  Cohen-Solal et al.
(Continued)

FOREIGN PATENT DOCUMENTS

WO     WO-2009036190 A1     3/2009
WO     WO-2014127065 A2     8/2014
(Continued)

OTHER PUBLICATIONS

Y. Zhang and Q. Ji, "Active and dynamic information fusion for facial expression understanding from image sequences," IEEE Transactions on Pattern Analysis and Machine Intelligence, vol. 27, No. 5, pp. 699-714, 2005.
(Continued)

*Primary Examiner* — Scott C Anderson
(74) *Attorney, Agent, or Firm* — Harness, Dickey & Pierce, P.L.C.

(57)     ABSTRACT
A computer device such as a smartphone includes at least one processor programmed to monitor a video feed from at least one camera to detect a facial profile of an operating user when a messaging interface is being used, match the detected facial profile against a known facial profile utilizing a facial recognition process to verify an identity of the operating user, determine a plurality of human expressions of the operating user based on the video feed and an expression recognition process, associate the plurality of human expressions with a plurality of contextual tags, generate a user profile in a user profile database based on the plurality of human expressions and the plurality of contextual tags, determine a current activity for the smartphone, associate the determined activity for the smartphone with one of the contextual tags, and update the user profile in the user profile database based on the association.

6 Claims, 8 Drawing Sheets

Related U.S. Application Data continuation of application No. 16/831,432, filed on Mar. 26, 2020, now Pat. No. 11,042,623, which is a continuation of application No. 16/397,787, filed on Apr. 30, 2019, now abandoned, which is a continuation of application No. 14/643,810, filed on Mar. 10, 2015, now Pat. No. 10,275,583.

(60) Provisional application No. 62/051,031, filed on Sep. 16, 2014, provisional application No. 61/985,059, filed on Apr. 28, 2014, provisional application No. 61/950,423, filed on Mar. 10, 2014.

(51) Int. Cl.

| | |
|---|---|
| *G06F 3/01* | (2006.01) |
| *G06F 3/03* | (2006.01) |
| *G06F 21/62* | (2013.01) |
| *G06Q 30/0251* | (2023.01) |
| *H04L 9/40* | (2022.01) |
| *H04W 4/21* | (2018.01) |
| *H04W 12/06* | (2021.01) |
| *G06V 40/16* | (2022.01) |
| *H04W 4/12* | (2009.01) |
| *H04W 12/65* | (2021.01) |

(52) U.S. Cl.
CPC ....... *G06F 21/629* (2013.01); *G06Q 30/0271* (2013.01); *H04L 63/0861* (2013.01); *H04W 4/21* (2018.02); *H04W 12/06* (2013.01); *G06F 2203/011* (2013.01); *G06V 40/174* (2022.01); *H04W 4/12* (2013.01); *H04W 12/65* (2021.01)

(56) References Cited

U.S. PATENT DOCUMENTS

| | | | |
|---|---|---|---|
| 7,165,268 | B1 | 1/2007 | Moore et al. |
| 7,246,244 | B2 | 7/2007 | Nanavati et al. |
| 7,698,745 | B2 | 4/2010 | Pauker et al. |
| 8,203,530 | B2 | 6/2012 | Chiang |
| 8,336,766 | B1 | 12/2012 | Miller et al. |
| 8,600,120 | B2 | 12/2013 | Gonion et al. |
| 8,620,850 | B2 | 12/2013 | Brown et al. |
| 8,798,374 | B2 | 8/2014 | Bartlett et al. |
| 8,922,480 | B1 | 12/2014 | Freed et al. |
| 9,008,416 | B2 | 4/2015 | Movellan et al. |
| 9,104,905 | B2 | 8/2015 | Whitehill et al. |
| 9,104,907 | B2 | 8/2015 | Whitehill et al. |
| 9,105,119 | B2 | 8/2015 | Whitehill et al. |
| 9,189,797 | B2 | 11/2015 | Ghosh et al. |
| 9,256,748 | B1 | 2/2016 | Gates et al. |
| 9,425,974 | B2 | 8/2016 | Tucker et al. |
| 9,443,167 | B2 | 9/2016 | Movellan et al. |
| 9,450,957 | B1 | 9/2016 | Daniel |
| 9,817,960 | B2 | 11/2017 | Leuthardt et al. |
| 10,275,583 | B2 | 4/2019 | Leuthardt et al. |
| 11,042,623 | B2 | 6/2021 | Leuthardt et al. |
| 2002/0019852 | A1 | 2/2002 | Bahar |
| 2002/0116508 | A1 | 8/2002 | Khan et al. |
| 2002/0169708 | A1* | 11/2002 | Chittenden ............ G06Q 40/04 |
| | | | 705/37 |
| 2003/0014372 | A1 | 1/2003 | Wheeler et al. |
| 2003/0115151 | A1 | 6/2003 | Wheeler et al. |
| 2003/0135740 | A1 | 7/2003 | Talmor et al. |
| 2003/0214535 | A1 | 11/2003 | Hymel |
| 2004/0018858 | A1 | 1/2004 | Nelson |
| 2005/0144451 | A1 | 6/2005 | Voice et al. |
| 2005/0163379 | A1 | 7/2005 | Zimmerman |
| 2005/0195927 | A1 | 9/2005 | Solonen |
| 2005/0251688 | A1 | 11/2005 | Nanavati et al. |
| 2006/0015812 | A1 | 1/2006 | Cunningham et al. |
| 2006/0075028 | A1 | 4/2006 | Zager et al. |
| 2006/0206725 | A1 | 9/2006 | Milgramm et al. |
| 2006/0282466 | A1 | 12/2006 | Yasukaga et al. |
| 2007/0074270 | A1 | 3/2007 | Meehan et al. |
| 2007/0208610 | A1 | 9/2007 | Pisaris-Henderson et al. |
| 2008/0218472 | A1 | 9/2008 | Breen et al. |
| 2009/0016617 | A1 | 1/2009 | Bregman-Amitai et al. |
| 2009/0141895 | A1 | 6/2009 | Anderson et al. |
| 2009/0193055 | A1 | 7/2009 | Kuberka |
| 2009/0327889 | A1 | 12/2009 | Jeong |
| 2010/0014720 | A1 | 1/2010 | Hoyos et al. |
| 2010/0125799 | A1 | 5/2010 | Roberts et al. |
| 2010/0141662 | A1 | 6/2010 | Storey et al. |
| 2010/0177116 | A1 | 7/2010 | Dahllof et al. |
| 2010/0205667 | A1 | 8/2010 | Anderson et al. |
| 2011/0125844 | A1 | 5/2011 | Collier et al. |
| 2011/0176667 | A1 | 7/2011 | Kumar |
| 2011/0296324 | A1 | 12/2011 | Goossens et al. |
| 2011/0304629 | A1 | 12/2011 | Winchester |
| 2012/0011120 | A1 | 1/2012 | Burnand et al. |
| 2012/0042263 | A1* | 2/2012 | Rapaport ............... G06Q 50/01 |
| | | | 709/204 |
| 2012/0054039 | A1 | 3/2012 | Patwa et al. |
| 2012/0054311 | A1 | 3/2012 | Mizuno et al. |
| 2012/0142316 | A1 | 6/2012 | Park |
| 2012/0162495 | A1 | 6/2012 | Ogawa |
| 2012/0164613 | A1 | 6/2012 | Jung |
| 2013/0005443 | A1 | 1/2013 | Kosta et al. |
| 2013/0185648 | A1 | 7/2013 | Kim |
| 2013/0235045 | A1 | 9/2013 | Corazza et al. |
| 2013/0242064 | A1 | 9/2013 | Herdy |
| 2013/0275223 | A1 | 10/2013 | Brelig |
| 2013/0300900 | A1 | 11/2013 | Pfister et al. |
| 2013/0322705 | A1 | 12/2013 | Wong |
| 2014/0075328 | A1* | 3/2014 | Hansen .................. G06Q 10/04 |
| | | | 715/747 |
| 2014/0085191 | A1 | 3/2014 | Gonion et al. |
| 2014/0093125 | A1* | 4/2014 | Hradetzky ......... G06Q 30/0268 |
| | | | 382/103 |
| 2014/0157424 | A1 | 6/2014 | Lee et al. |
| 2014/0195345 | A1 | 7/2014 | Lyren |
| 2014/0195942 | A1 | 7/2014 | Bak et al. |
| 2014/0198958 | A1 | 7/2014 | Nathan et al. |
| 2014/0201844 | A1 | 7/2014 | Buck |
| 2014/0278910 | A1* | 9/2014 | Visintainer ........ G06Q 30/0242 |
| | | | 705/14.41 |
| 2014/0314284 | A1 | 10/2014 | Movellan et al. |
| 2014/0316881 | A1 | 10/2014 | Movellan et al. |
| 2014/0323193 | A1* | 10/2014 | Keilwert ............. G07F 17/3227 |
| | | | 463/16 |
| 2014/0351163 | A1 | 11/2014 | Tussy |
| 2014/0366158 | A1 | 12/2014 | Han et al. |
| 2014/0372301 | A1 | 12/2014 | Anamanamuri |
| 2015/0015690 | A1 | 1/2015 | Roh et al. |
| 2015/0033017 | A1 | 1/2015 | Uliyar et al. |
| 2015/0046996 | A1 | 2/2015 | Slaby et al. |
| 2015/0049953 | A1 | 2/2015 | Movellan et al. |
| 2015/0254447 | A1 | 9/2015 | Leuthardt et al. |
| 2015/0287054 | A1 | 10/2015 | Movellan et al. |
| 2015/0381575 | A1 | 12/2015 | Bhargav-Spantzel et al. |
| 2020/0193068 | A1 | 6/2020 | Jones |

FOREIGN PATENT DOCUMENTS

| | | | |
|---|---|---|---|
| WO | WO-2014127333 A1 | 8/2014 | |
| WO | WO-2014127065 A3 | 10/2014 | |

OTHER PUBLICATIONS

M. Pantic and I. Patras, "Dynamics of facial expression: recognition of facial actions and their temporal segments from face profile image sequences," IEEE Transactions on Systems, Man, and Cybernetics, Part B: Cybernetics, vol. 36, No. 2, pp. 433-449, 2006.

Y. Tong, W. Liao, and Q. Ji, "Facial action unit recognition by exploiting their dynamic and semantic relationships," IEEE Transactions on Pattern Analysis and Machine Intelligence, vol. 29, No. 10, pp. 1683-1699, 2007.

Y. Zhang, Q. Ji, Z. Zhu, and B. Yi, "Dynamic facial expression analysis and synthesis with MPEG-4 facial animation parameters,"

(56) References Cited

OTHER PUBLICATIONS

IEEE Transactions on Circuits and Systems for Video Technology, vol. 18, No. 10, pp. 1383-1396, 2008.

Tingfan Wu, Nicholas J. Butko, Paul Ruvolo, Jacob Whitehill, Marian S. Bartlett, and Javier R. Movellan, "Multilayer Architectures for Facial Action Unit Recognition," IEEE Transactions on Systems, Man, and Cybernetics—Part B: Cybernetics, vol. 42, No. 4, Aug. 2012.

Alan Mislove; A secure, resilient, cooperative messaging system; researchgate.net: 2003; p. 1-6.

Chintapudi et al., "Online Signature Verification for Secure Transactions", International Journal of Scientific Engineering and Technology Research vol. 04, Issue No. 35, Aug. 2015, pp. 7283-7286.

G. Di Crescenzo; Approximate Message Authentication and Biometric Entity Authentication; Springer; pp. 240-254, (Year: 2005).

Google Scholar Search; Shoulder Surfing Prevention; available at http://scholar.google.com/scholar?hl=en&as_sdt=0,47&q=shoulder+surfing+prevention [last visited Jun. 26, 2017 9:59:33 AM].

Statista, ("Number of smartphones sold to end users worldwide from 2007 to 2017 (in million units)", online at www.statista.com/statistics/263437/global-smartphone-sales-to-end-users-s-ince-2007/ (Year: 2018).

Mudassar Raza; "A Survey of Password Attacks and Comparative Analysis on Methods for Secure Authentication"; World Applied Sciences Journal; Year 2012; pp. 439-444.

Non-Final Office Action from corresponding U.S. Appl. No. 17/353,270, dated Dec. 30, 2022.

Final Office Action from corresponding U.S. Appl. No. 17/353,270, dated Jul. 14, 2023.

Notice of Allowance from corresponding U.S. Appl. No. 17/353,270, dated Nov. 21, 2023.

* cited by examiner

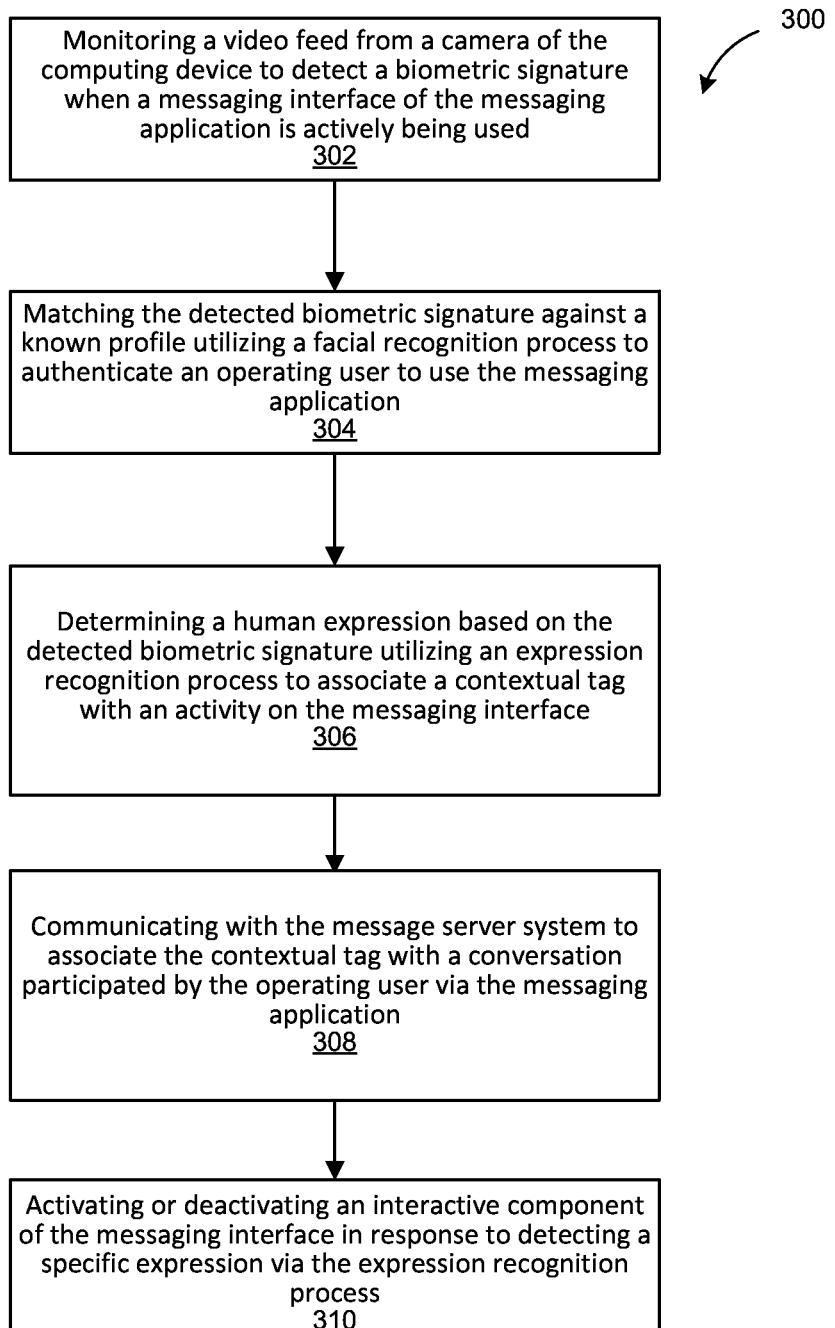

300

Monitoring a video feed from a camera of the computing device to detect a biometric signature when a messaging interface of the messaging application is actively being used
302

Matching the detected biometric signature against a known profile utilizing a facial recognition process to authenticate an operating user to use the messaging application
304

Determining a human expression based on the detected biometric signature utilizing an expression recognition process to associate a contextual tag with an activity on the messaging interface
306

Communicating with the message server system to associate the contextual tag with a conversation participated by the operating user via the messaging application
308

Activating or deactivating an interactive component of the messaging interface in response to detecting a specific expression via the expression recognition process
310

*FIG. 3*

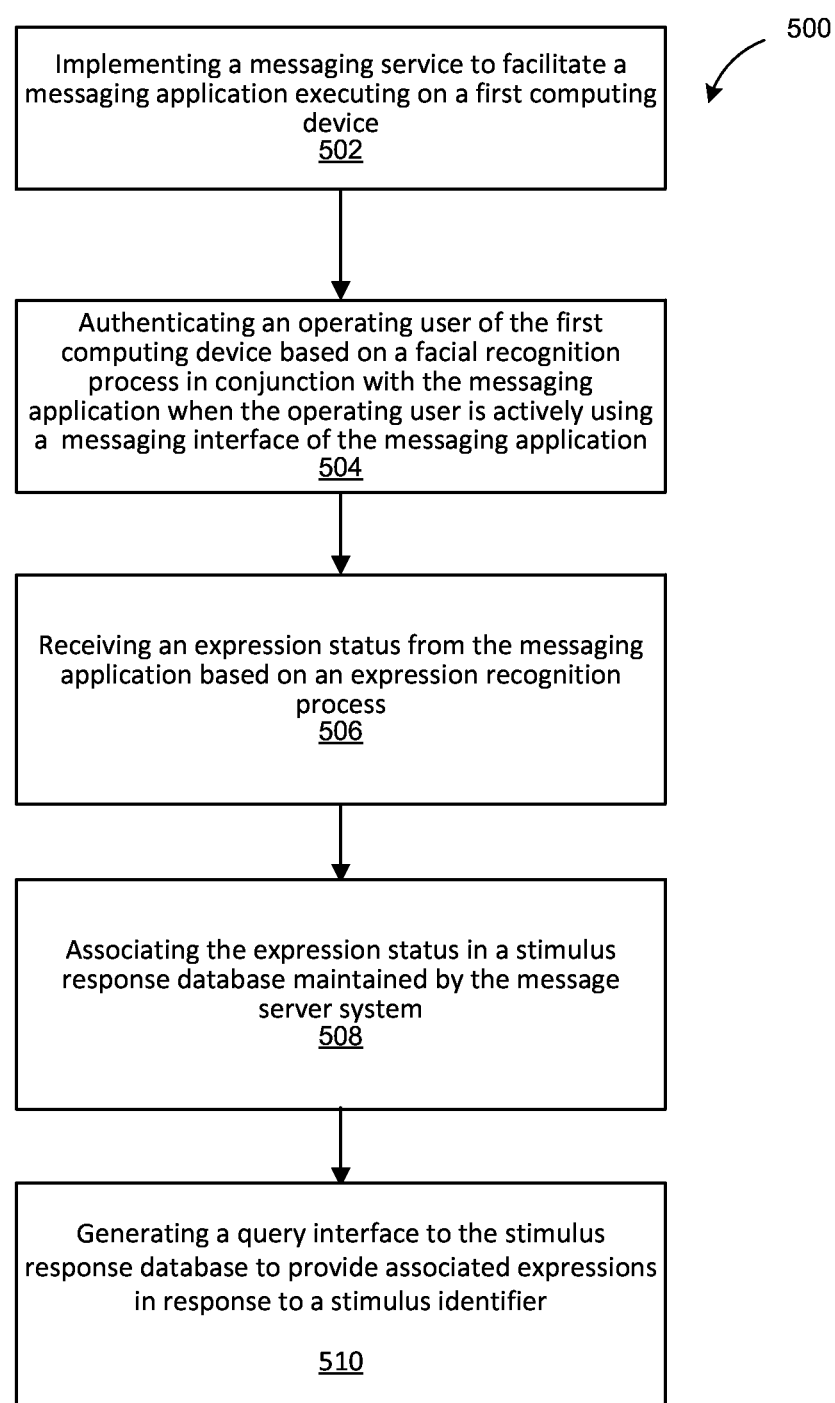

500

Implementing a messaging service to facilitate a messaging application executing on a first computing device
502

Authenticating an operating user of the first computing device based on a facial recognition process in conjunction with the messaging application when the operating user is actively using a messaging interface of the messaging application
504

Receiving an expression status from the messaging application based on an expression recognition process
506

Associating the expression status in a stimulus response database maintained by the message server system
508

Generating a query interface to the stimulus response database to provide associated expressions in response to a stimulus identifier

| 610 |
| --- |
| Processor(s) |

| Memory   620 |
| --- |
| Code 670 |

630

| 640 |
| --- |
| Network Adapter |

| 650 |
| --- |
| Storage Adapter |

To/From
clients
and/or other
nodes

To/From
Persistent
Storage

EXPRESSION RECOGNITION IN MESSAGING SYSTEMS

CROSS REFERENCE TO RELATED APPLICATIONS

This application is a continuation of U.S. patent application Ser. No. 17/353,270 filed Jun. 21, 2021, which is a continuation of U.S. patent application Ser. No. 16/831,432 filed Mar. 26, 2020, which is a continuation of U.S. patent application Ser. No. 16/397,787 filed Apr. 30, 2019, which is a continuation of U.S. patent application Ser. No. 14/643,810 filed Mar. 10, 2015, and issued Apr. 30, 2019 as U.S. Pat. No. 10,275,583, which claims the benefit of U.S. Provisional Patent Application No. 61/950,423 filed Mar. 10, 2014, U.S. Provisional Patent Application No. 61/985,059 filed Apr. 28, 2014, and U.S. Provisional Patent Application No. 62/051,031 filed Sep. 16, 2014. The entire disclosures of each of the above applications are incorporated herein by reference.

RELATED FIELD

At least one embodiment of this disclosure relates generally to an electronic messaging system, and in particular to privacy and security of an electronic messaging system.

BACKGROUND

With the wide availability of mobile devices, in some areas/cultures, electronic messaging is becoming an integral part of a person's life. Because of this, privacy and security concerns arise over the use of such systems. Conventional technology protects against privacy violations by providing a screen lock on a mobile device whenever the mobile device is not used. An authorized user can unlock the screen by typing a passcode into the mobile device. However, the passcode is knowledge that is transferable, and hence may be stolen. Furthermore, the screen lock prevents access to other applications on the mobile device, making it unnecessarily inconvenient. Other solutions protect against violation by scheduling the destruction of a message to ensure that its content therein does not survive indefinitely.

BRIEF DESCRIPTION OF THE DRAWINGS

FIG. 3 is a flow chart of a method of operating a messaging application on a computing device that implements an expression recognition process, in accordance with various embodiments.

FIG. 5 is a flow chart of a method of operating a message server system that facilitates conversations between computing devices, in accordance with various embodiments.

Figure 1A:
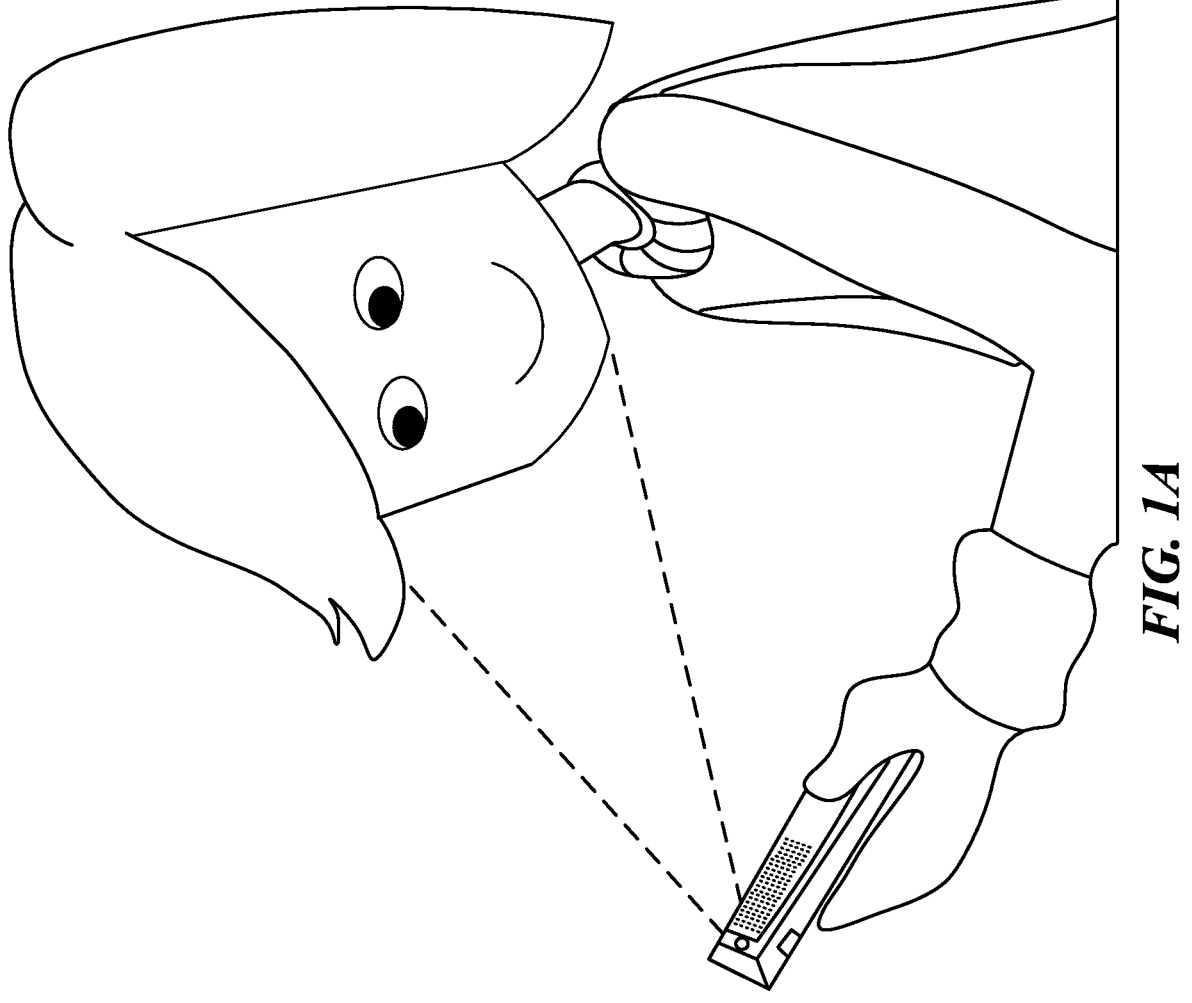
FIG. 1A is a diagram illustrating a messaging application of a mobile device revealing content of a message when a facial profile associated with a recipient account is recognized, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Disclosed is a technology that pertains to protecting messages through a messaging system via a biometric security mechanism. The messaging system includes a message server system comprising one or more computer servers and messaging applications running on end-user devices. The end-user devices can include personal computers, smart phones, tablets, wearable devices, gaming consoles, smart TVs, other electronic gadgets, or any combination thereof. The messaging applications act as independent agents for the messaging system. For example, a messaging application may be installed on a general-purpose operating system (e.g., Windows, android, IOS, etc.). The messaging application can also be implemented by client-side script (e.g., JavaScript) that may be executed on a web browser of the end-user devices.

The biometric security mechanism is implemented via the messaging application. Unlike the conventional security mechanisms for a recipient user device that protect privacy only of the user of the recipient user device, the disclosed biometric security mechanism also protects the privacy and security of the sender of the message. This enables a new paradigm of protection for stakeholders (e.g., the message senders) who are conventionally dependent solely on the message recipients to protect their interests.

In various embodiments, the disclosed technology uses sensors in end-user devices to monitor and profile an end-user. Such profiling can serve to ensure security (for example, by utilizing biometric recognition, such as facial recognition or ear recognition). Such profiling can also serve to enhance context mining (for example, by utilizing expression recognition). In some embodiments, the expression recognition can be implemented without implementing the biometric recognition. In some embodiments, the biometric recognition can be implemented without implementing expression recognition.

Security

The biometric security mechanism implements a biometric recognition process to verify one or more identities as authorized by the message senders. For example, the biometric recognition process may be based on facial recognition, ear recognition, silhouette recognition, speaker recognition, fingerprint recognition, device motion pattern recognition, contact pattern recognition, etc. The biometric security mechanism can detect biometric patterns utilizing a sensor, such as a camera, a microphone, an accelerometer, a touch sensor, a gyroscope, etc. The biometric security mechanism can then profile (e.g., by recording patterns and then training one or more computational functions that recognize one or more shared attributes or characteristic of the patterns) the biometric patterns of one or more users into a profile model utilizing machine learning algorithms, such as support vector machines, Gaussian mixture models, hidden Marcov models, etc. Based on the profiles of the users, the biometric security mechanism can recognize a user in real-time by matching the biometric pattern detected by a sensor with the profile model.

The biometric security mechanism is instantiated whenever the messaging interface of the message application is actively opened and running on an end-user device (e.g., such that the mechanism is active while the message application is open). The biometric security mechanism utilizes one or more types of biometric recognition processes to determine whether the people who have access to the end-user device (e.g., looking at the screen of the end-user device) are consistent with the privacy settings of the sender account and the recipient account.

To use the messaging application on a user device, a user may have to identify a messaging system account associated with the messaging system. The biometric security mechanism uses the one or more types of biometric recognition processes to ensure that an operator using the messaging application matches a biometric profile of the messaging system account. This procedure ensures that a third party (e.g., a brother or a classmate) cannot send messages on behalf of the user. In the case that there are multiple operators for the same end-user device, this procedure also ensures that independent private sessions of using the messaging application can be established based on automatic biometric recognition.

The biometric security mechanism can provide customizable privacy shields per message or conversation. These privacy shields may be customized by privacy settings dictated by the sender of the message or the initiator of the conversation. The biometric security mechanism can use the one or more types of biometric recognition processes to ensure that the operator using the messaging application matches an authorized biometric profile in accordance with a privacy setting of an individual conversation or message. For example, the default privacy setting may be that the message or conversation is revealed when a biometric profile of the recipient account is recognized by the biometric security mechanism. In another example, the default privacy setting may be that the message or conversation is revealed only when the biometric profile of the recipient account is recognized without the presence of other detected human beings in the proximate area of the recipient end-user device.

In some embodiments, the privacy setting can indicate a single authorized account or biometric profile. In some embodiments, the privacy setting can indicate a group of authorized accounts or biometric profiles. In some embodiments, the privacy setting can indicate an attribute of a biometric profile, such as age, gender, facial gesture, facial expression, vocal pitch, etc. The attribute can be the sole variable to authorize a person. For example, the privacy setting can indicate that any female face (e.g., in the case of facial recognition) or any female voice (e.g., in the case of speaker recognition) would be authorized. The attribute can be an additional conditional on top of a specific account or biometric profile. For example, a sender account (e.g., John) may send a message with a privacy setting indicating Nancy as the recipient account. In some cases, the privacy setting can add an attribute of the recipient profile being female.

The privacy shield may be implemented, for example, as a screen lock, a scrambling of the message content, a blur of the message content, a blackout of the message content, or any combination thereof. In some embodiments, the biometric security mechanism continuously loops through the one or more types of biometric recognition processes. In some embodiments, the biometric security mechanism disengages the privacy shield whenever an authorized biometric profile is recognized and detected. In some embodiments, the biometric security mechanism engages the privacy shield whenever a non-authorized biometric profile is detected.

A sender account or a recipient account can be associated with a single individual or a group of individuals. In the case of a group of individuals, biometric profiles of every member are associated with the sender account or the recipient account.

Expression Recognition

The use of the biometric security mechanism provides a dependable authentication process that improves or guarantees privacy of the users of the messaging system. Accordingly, the users can trust that the biometric recognition process is used for protection instead of exploitation. Because of this trust, an expression recognition process can be run concurrently to the biometric recognition process. That is, a user, who otherwise would not use a messaging application with an expression recognition process, would use that same messaging application if the biometric recognition process were there to guarantee security and privacy.

The disclosed technology can implement expression recognition process in addition to the biometric recognition process to provide additional contextual information associated with a user's emotional/mood state when using a messaging application. The expression recognition of a user of the messaging system can provide several benefits. For example, the message server system can maintain a stimulus response database that maps associations between stimuli presented on the messaging interface and expressions recognized by the expression recognition process. The message server system can then generate and provide a query interface to present consumer data (e.g., anonymized consumer data) based on the stimulus response database for advertisers, researchers, or business intelligence departments.

For another example, the messaging application can use the expression recognition process to personalize the messaging application. In some cases, based on the responding expression of a user when viewing a particular type of message (e.g., from a particular sender or during a particular time of day), the messaging application can determine whether or not to present another message of the same type via the messaging interface.

For another example, the messaging application can use the expression recognition process to add gesture control to the messaging application. In some cases, certain facial expressions can correspond to a gesture control to activate or deactivate an interactive component of the messaging application. In one specific example, a frown detected by the expression recognition process can cause the messaging application to suspend.

For another example, the messaging application can use the expression recognition process to customize targeted advertisement. In some cases, an advertisement may be selected based on the current mood of the user. The current mood of the user, in turn, can be estimated based on the expression recognized. In some cases, presentation of an advertisement may be triggered based on a user expression condition. For example, an advertisement may be shown only when the user is recognized to be smiling.

For another example, the messaging application can use the expression recognition process to add context to conversations between users of the messaging system. In some cases, the recognized expression of a sender user can be added as an emoticon to a message. In some cases, the recognized expression of a viewer user can be fed back to the sender as a status update.

ALTERNATIVE EMBODIMENTS

The disclosure above pertains to the specific example of an electronic messaging system for delivery of text, images, audio clips, or video clips. However, it is within the contemplation of this disclosure to implement the biometric security mechanism to other similar systems that include registration of a sender account and the receiver account. For example, the biometric security mechanism can apply to email, social network, dating network, event/meet up invitation, physical delivery of goods, enterprise messaging (e.g., financial agent to customer messaging, real estate agent to customer messaging, medical professional messaging, etc.), or any combination thereof. The biometric security mechanism is advantageous in enforcing privacy settings of the sender at the device of the recipient. This is an improvement over existing technology that only seeks to protect against unauthorized exposure of content on behalf of the device owner but not on behalf of the sender.

The biometric security mechanism is also advantageous in preventing impersonation attempts, such as for the purpose of cyber bullying, by verifying the identity of a message sender when composing a message. This improves the overall accountability of messaging within the messaging system. Similarly, in an enterprise environment, the authentication in both viewing and composition of the message enhances enterprise-level security and compliance (e.g., eHealth compliance when the message content involves medical information).

The disclosure above assumes that the messaging application implements both the biometric security mechanism and a messaging interface (e.g., to compose and read messages). However, it is within the contemplation of this disclosure to implement the biometric security mechanism on a separate device or application from where the messaging interface is implemented. For example, in the case of an enterprise email system, an email access interface may be provided on a desktop computer while the biometric security mechanism may be implemented on a mobile device (e.g., a smart phone). In this example, the biometric security mechanism can require the mobile device to connect with the email access interface on the desktop computer. The biometric security mechanism can perform the biometric recognition process to verify that there is a secure environment near the desktop computer (e.g., no unauthorized user is around and/or an authorized user is present). In response to verifying a secure environment, the biometric security mechanism can notify the email access interface to reveal content of a message.

Figure 1B:
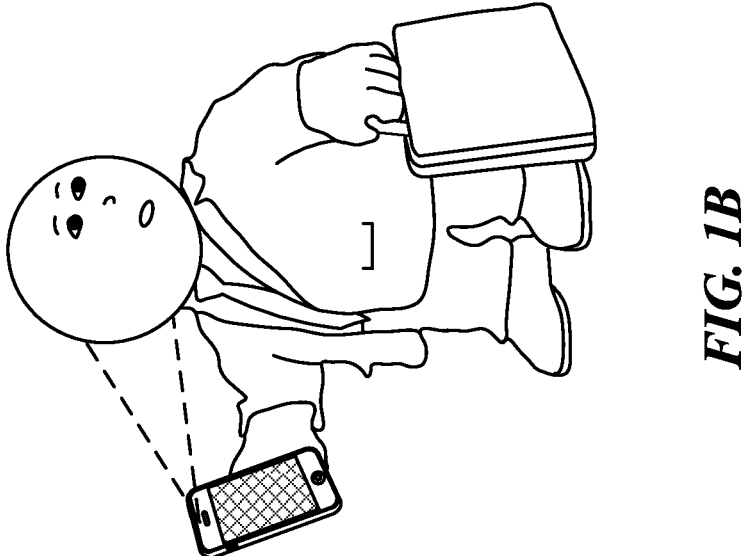
FIG. 1B is a diagram illustrating a messaging application of a mobile device hiding content of a message when a facial profile associated with a recipient account is not detected, in accordance with various embodiments.
Figure 1C:
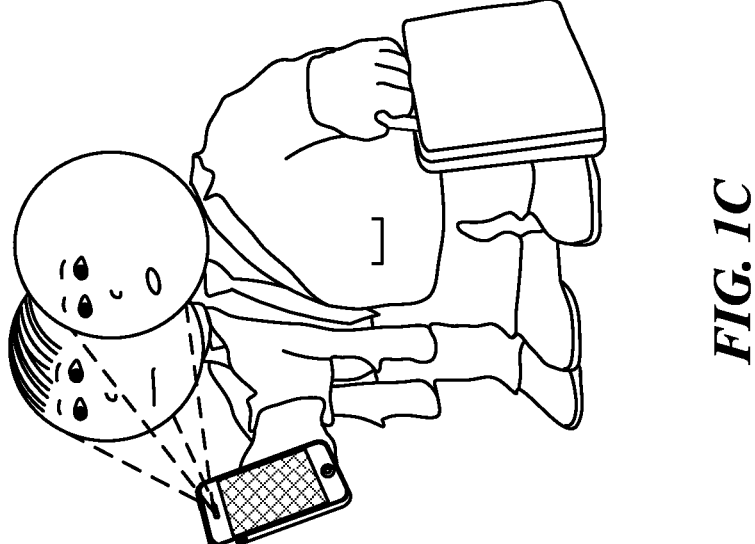
FIG. 1C is a diagram illustrating a messaging application of a mobile device hiding content of a message when a facial profile associated with a recipient account is detected and a second unauthorized facial profile is detected, in accordance with various embodiments.

FIGS. 1A through 1C illustrate an example of the biometric security mechanism that implements a facial recognition process to protect the privacy of both a sender of a message and a recipient of the message. FIG. 1A is a diagram illustrating a messaging application of a mobile device revealing content of a message when a facial profile associated with a recipient account is recognized, in accordance with various embodiments. FIG. 1B is a diagram illustrating a messaging application of a mobile device hiding content of a message when a facial profile associated with a recipient account is not detected, in accordance with various embodiments. FIG. 1C is a diagram illustrating a messaging application of a mobile device hiding content of a message when a facial profile associated with a recipient account is detected and a second unauthorized facial profile is detected, in accordance with various embodiments.

Figure 2:
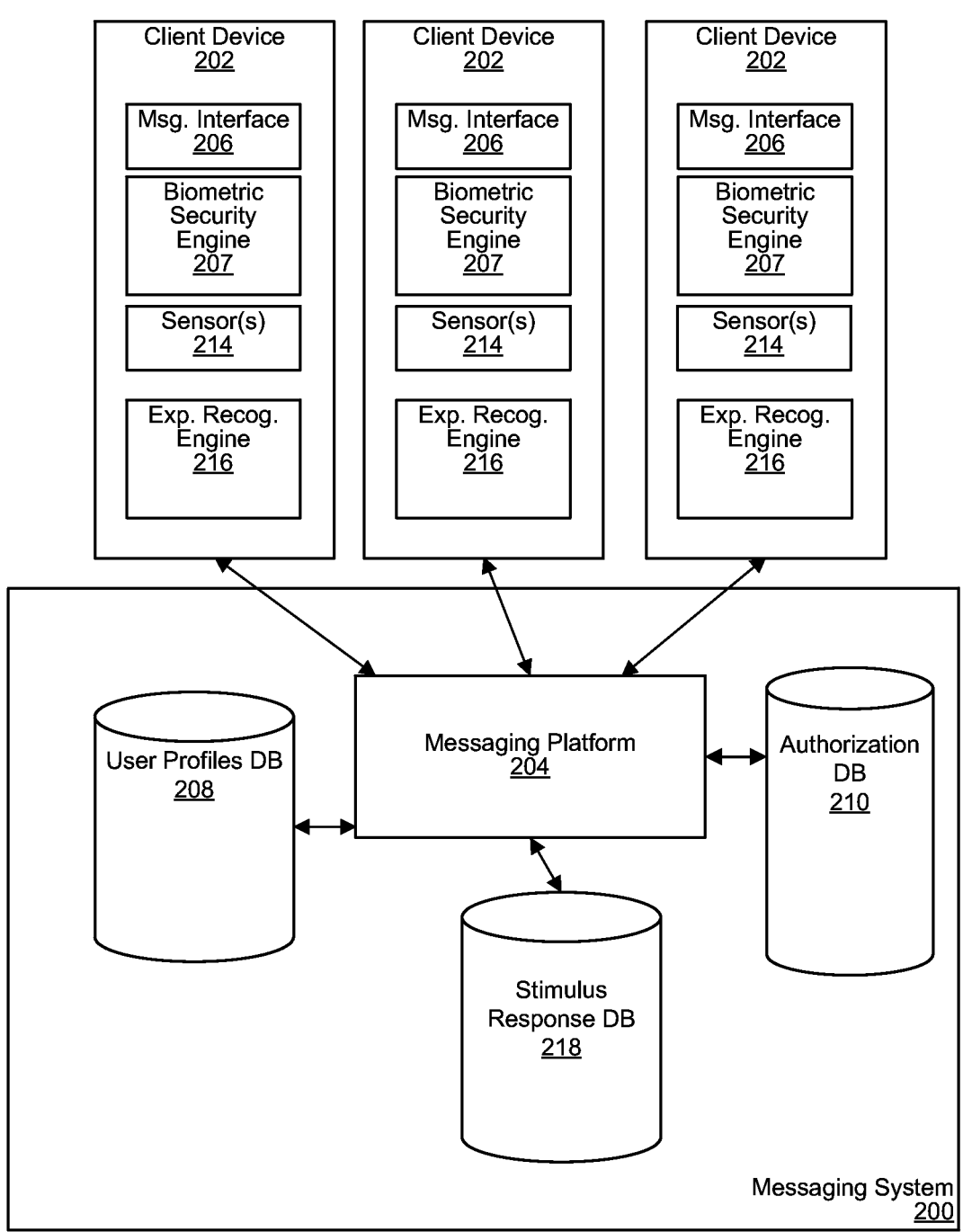
FIG. 2 is a block diagram of a system environment of a messaging system implementing a biometric security mechanism, in accordance with various embodiments.

FIG. 2 is a block diagram of a system environment of a messaging system 200 implementing a biometric security mechanism, in accordance with various embodiments.

The messaging system 200 can communicate with client devices 202 (e.g., mobile phones, tablets, desktop computers, laptops, other network-enabled devices, or any combination thereof). The messaging system 200 can include a messaging platform system 204 (e.g., one or more computer servers) configured to provide a service to facilitate human-understandable electronic communication between user accounts. The human-understandable electronic communication can include emoticons, text, photos, audio clips, videos, links, images, or any combination thereof. The human-understandable content of the electronic communication may be part of an electronic message or can be referenced in the electronic message (e.g., stored elsewhere that is accessible through a network).

In some embodiments, each of the client devices 202 can have its own instance of a messaging interface 206 and a corresponding instance of a biometric security engine 207 running thereon that communicates with the messaging platform system 204. In some embodiments, the messaging interface 206 and the biometric security engine 207 are part of a messaging application running and/or installed on the client device. In some embodiments, the messaging interface 206 is installed and/or running on a first client device and the biometric security engine 207 is installed and/or running on a second client device. In these embodiments, the biometric security engine 207 on the second client device can control a privacy shield implemented by the messaging interface 206.

For example, the messaging interface 206 and/or the biometric security engine 207 can be embodied as a mobile application running on operating systems of some of the client devices 202. In another example, the messaging interface 206 and/or the biometric security engine 207 can be implemented as a web-based application running on web browsers on some of the client devices 202.

The client devices 202 can be associated with user accounts. In some embodiments, a user account of the messaging system 200 can have multiple client devices associated therewith. In some embodiments, a client device can have multiple user accounts associated therewith. Conversations between user accounts are tracked by the messaging system 200 such that the messaging system 200 can deliver an electronic message from a client device of one user account to a client device of another user account.

In some embodiments, the messaging system 200 can include a user profile database 208. The user profile database 208 is configured to store user profiles of one or more user accounts. The user profiles may be associated with one or more social networking systems (e.g., an affiliated social networking system, a social networking system integrated with the messaging system 200, or an external social networking system) and social network profiles in the social networking systems.

In various embodiments, the messaging interface 206 can implement a privacy shield. The biometric security engine 207, for example, can recognize whether or not an authorized user is present by analyzing a video feed from its respective client device using a facial recognition algorithm.

The messaging platform system 204 can maintain biometric profiles of user accounts in the user profile database 208. The messaging platform system 204 associates a sender account and a receiver account with every message (e.g., as specified by the sender account). The biometric profiles of the sender account and the receiver account can both be considered "authorized users." One or more lists of authorized users may be stored in an authorization database 210. The authorization database 210 can also maintain one or more lists of blacklisted user accounts that are explicitly unauthorized. In some embodiments, the sender account, the receiver account, or both can add additional user accounts to the list of authorized users. In some embodiments, the sender account, the receiver account, or both can add one or more user accounts to the list of "blacklisted" user accounts.

The authorization database 210 can store a list of authorized users specific to a message conversation or specific to a user account (e.g., specific to a sender account, a receiver account, or both). For example, for each message or conversation sent or each message or conversation received, a user can add or remove one or more accounts from the list of authorized users or blacklisted users. For another example, a first user account can add a second user account as an authorized user (e.g., a spouse) or a blacklisted user (e.g., a rival friend or sibling) for all conversations that the first user account participates in. In some embodiments (e.g., as required by law) the authorization database 210 can also store a list of globally authorized users.

The messaging platform system 204 can communicate with the biometric security engine 207 to secure content of messages. For example, the messaging platform system 204 can send biometric profiles (e.g., facial profiles) of the authorized users and/or expressly unauthorized users to be verified on a client device by the biometric security engine 207. The biometric security engine 207 can monitor outputs of a sensor 214 (e.g., a camera) to detect and recognize biometric profiles. In some embodiments, the messaging platform system 204 can request the biometric security engine 207 to capture and send an image or a video of its operator to be verified on the messaging platform system 204. In those embodiments, the messaging platform system 204 returns the result of the verification back to the biometric security engine 207.

Once the biometric security engine 207 determines that a secure environment is present, the biometric security engine 207 can control the privacy shield implemented in the messaging interface 206 to either reveal or hide content of a message. The privacy shield implemented by the messaging interface 206 can reveal content of a message conversation when the authorized user is detected. In some embodiments, the privacy shield can hide the content in response to detecting both an authorized user and an unauthorized user (e.g., implicitly unauthorized or expressly unauthorized). In some embodiments, the privacy shield can hide the content whenever an expressly unauthorized user account is detected.

In some embodiments, the client devices 202 can each also include an expression recognition engine 216. The expression recognition engine 216 can configure a client device 202 to execute the disclosed expression recognition process. For example, the expression recognition engine 216 can implement the methods described in FIG. 3, FIG. 4, and FIG. 5. In some embodiments, the expression recognition engine 216 can be integrated with the biometric security engine 207. In some embodiments, the expression recognition engine 216 can be part of the same messaging application as the messaging interface 206.

The expression recognition engine 216 can utilize the one or more sensors 214 to monitor at least a biometric signature of an operating user. For example, the biometric signature can be a facial profile, a head profile, a mouth profile, a hand gesture profile, a gait profile, a vocal profile, or any combination thereof. From the biometric signature, the expression recognition engine 216 can determine an expression state. The expression state can correspond to an emotion, a mood, or other patterns recognizable across the biometric signatures of various people.

In some embodiments, the expression recognition engine 216 can upload recognized expression states of an operating user to the messaging platform system 204. The expression recognition engine 216 can also upload associated metadata (e.g., time stamp, associated user identifier, etc.) to the messaging platform system 204. Based on the expression states and the associated metadata, the messaging platform system 204 can maintain a stimulus response database 218. The stimulus response database 218 logs and tracks the expression state of an operating user in response to an activity occurring on the messaging interface 206. The activity, for example, can be the operating user composing a message, viewing a message, viewing an advertisement, viewing a media object, or any combination thereof. The stimulus response database 218 can generate a query interface such that an authorized agent of the messaging system 200 can access statistic of specific users or groups of users.

FIG. 3 is a flow chart of a method 300 of operating a messaging application (e.g., the expression recognition engine 216 of FIG. 2) on a computing device (e.g., one of the client devices 202 of FIG. 2) that implements an expression recognition process, in accordance with various embodiments.

At step 302, the computing device can monitor a video feed from a camera of the computing device to detect a biometric signature when a messaging interface of the messaging application is actively being used. At step 304, the computing device can match the detected biometric signature against a known profile utilizing a facial recognition process to authenticate an operating user to use the messaging application. The known profile can be stored in the computing device or a messaging server system (e.g., the messaging platform system 204 of FIG. 2). In some embodiments, the biometric signature is a facial profile and the biometric recognition process is a facial recognition process.

As step 306, the computing system can determine a human expression based on the detected biometric signature utilizing an expression recognition process to associate a contextual tag with an activity on the messaging interface. At step 308, the computing system can communicate with the message server system to associate the contextual tag with a conversation involving or participated by the operating user (e.g., where the operating user engaged in the conversation through the messaging application).

In some cases, the messaging interface is being used to compose a message in the conversation. In those cases, communicating with the message server system can include sending the contextual tag as an emoticon embedded as part of the message to configure the message server system to distribute the emoticon to another participant of the conversation. In another example, communicating with the message server system can include sending the contextual tag as an emotion status that is time stamped to configure the message server system to maintain an emotion status record of at least a participant of the conversation. In some cases, the messaging interface is being used to read a message in the conversation. In those cases, communicating with the message server system can include sending the contextual tag as an emotion status that is time stamped to configure the message server system to present the emotion status to another participant of the conversation. The other participant, for example, can be the writer of the message.

In some cases, communicating with the message server system can include personalizing the messaging application based on the contextual tag. In some cases, communicating with the message server system can include archiving an expression log associated with the operating user on the message server system.

Optionally, at step 310, the computing device can activate or deactivate an interactive component of the messaging interface in response to detecting a specific expression via the expression recognition process. That is, biometric expressions (e.g., facial expressions) can be used as a gesture control of the messaging interface/messaging application.

Figure 4:
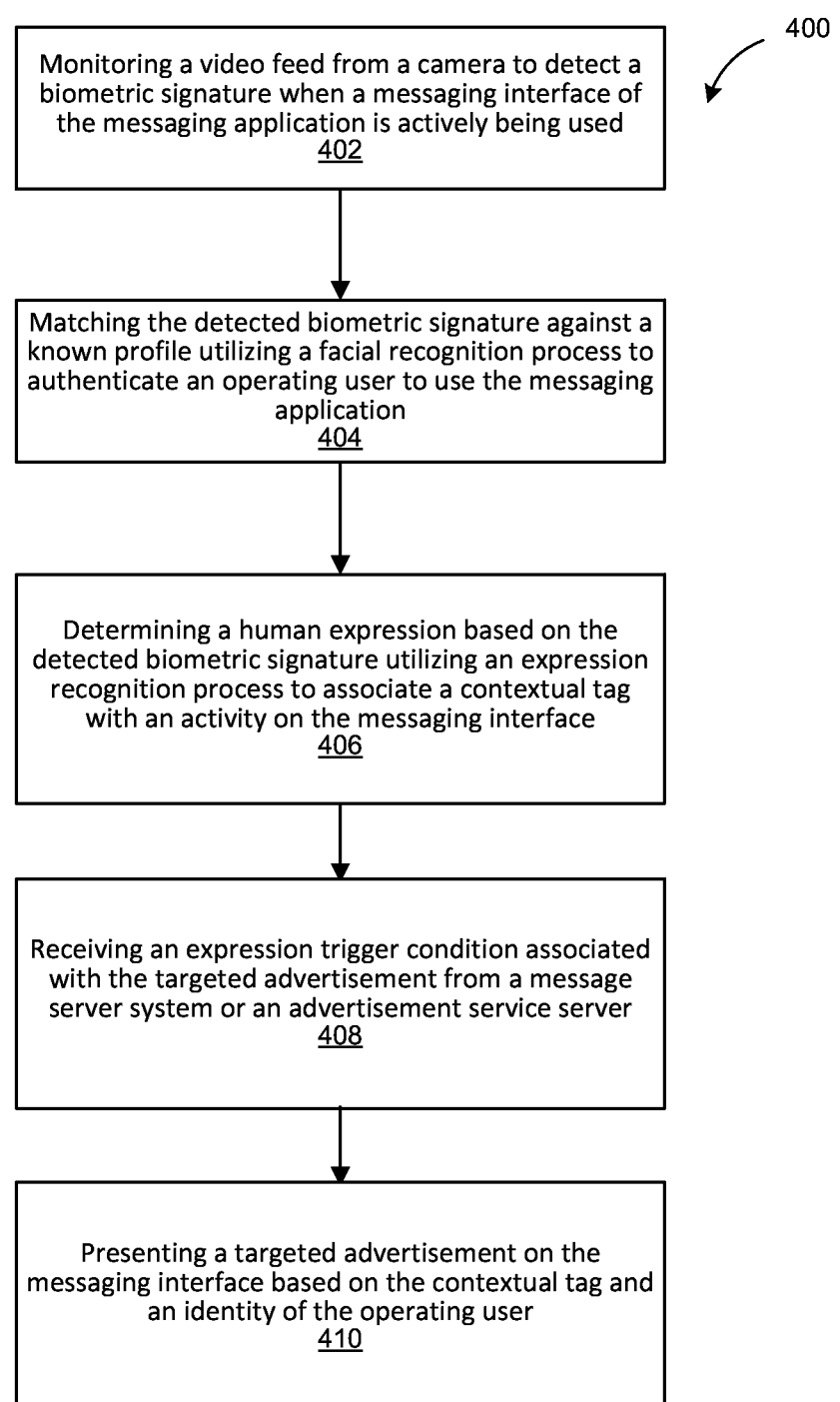
FIG. 4 is a flow chart of a method of operating a messaging application on a computing device capable of delivering advertisements, in accordance with various embodiments.

FIG. 4 is a flow chart of a method 400 of operating a messaging application (e.g., the expression recognition engine 216 of FIG. 2) on a computing device (e.g., one of the client devices 202 of FIG. 2) capable of delivering advertisements, in accordance with various embodiments. At step 402, the computing device monitors a video feed from a camera (e.g., one of the sensors 214 of FIG. 2) to detect a biometric signature when a messaging interface of the messaging application is actively being used. At step 404, the computing device can match the detected biometric signature against a known profile utilizing a facial recognition process to authenticate an operating user to use the messaging application.

At step 406, the computing device determines a human expression based on the detected biometric signature utilizing an expression recognition process to associate a contextual tag with an activity on the messaging interface. Optionally, at step 408, the computing device can receive an expression trigger condition associated with the targeted advertisement from a message server system or an advertisement service server. At step 410, the computing device presents a targeted advertisement on the messaging interface based on the contextual tag and an identity of the operating user. The targeted advertisement can be presented in response to determining that the contextual tag corresponds to the expression trigger condition. The expression trigger condition, for example, can include a smile, a laugh, a grimace, a frown, a pout, or any combination thereof. The expression trigger condition can include an expression corresponding to a mood or an emotion, a micro expression, a stimulated expression, a neutralized expression, a masked expression, or any combination thereof.

Presenting the targeted advertisement can include selecting the targeted advertisement from multiple options based on the contextual tag. Selecting the targeted advertisement can be based on a time stamp of the contextual tag in relation to an activity (e.g., user action or messaging-app-side activity) occurring on the messaging interface near or at the time stamp. Selecting the targeted advertisement can be based on an expression trigger condition associated with the targeted advertisement.

FIG. 5 is a flow chart of a method 500 of operating a message server system (e.g., the messaging platform system 204 of FIG. 2) that facilitates conversations between computing devices (e.g., the client devices 202 of FIG. 2), in accordance with various embodiments. At step 502, the message server system implements a messaging service to facilitate a messaging application executing on a first computing device. At step 504, the message server system authenticates an operating user of the first computing device based on a facial recognition process in conjunction with the messaging application when the operating user is actively using a messaging interface of the messaging application.

At step 506, the message server system receives an expression status from the messaging application based on an expression recognition process. Receiving the expression status can include receiving metadata associated with the expression status. The metadata, for example, can include a time stamp, a user identifier, a language identifier (e.g., identifies the language used in the conversation), an ethnic identifier of the user, an associated user action identifier (e.g., what the user was doing on the messaging interface), user response time, or any combination thereof.

At step 508, the message server system associates the expression status in a stimulus response database maintained by the message server system. At step 510, the message server system generates a query interface to the stimulus response database to provide associated expressions in response to a stimulus identifier.

The stimulus identifier, for example, can correspond to a corporate word, a political word, or a social word. The stimulus identifier, for another example, can correspond to a media object (e.g., image, text string, audio, video clip, etc.). The stimulus identifier can also correspond to an advertisement.

While processes or methods are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. In addition, while processes or blocks are at times shown as being performed in series, these processes or blocks may instead be performed in parallel, or may be performed at different times.

Figure 6:
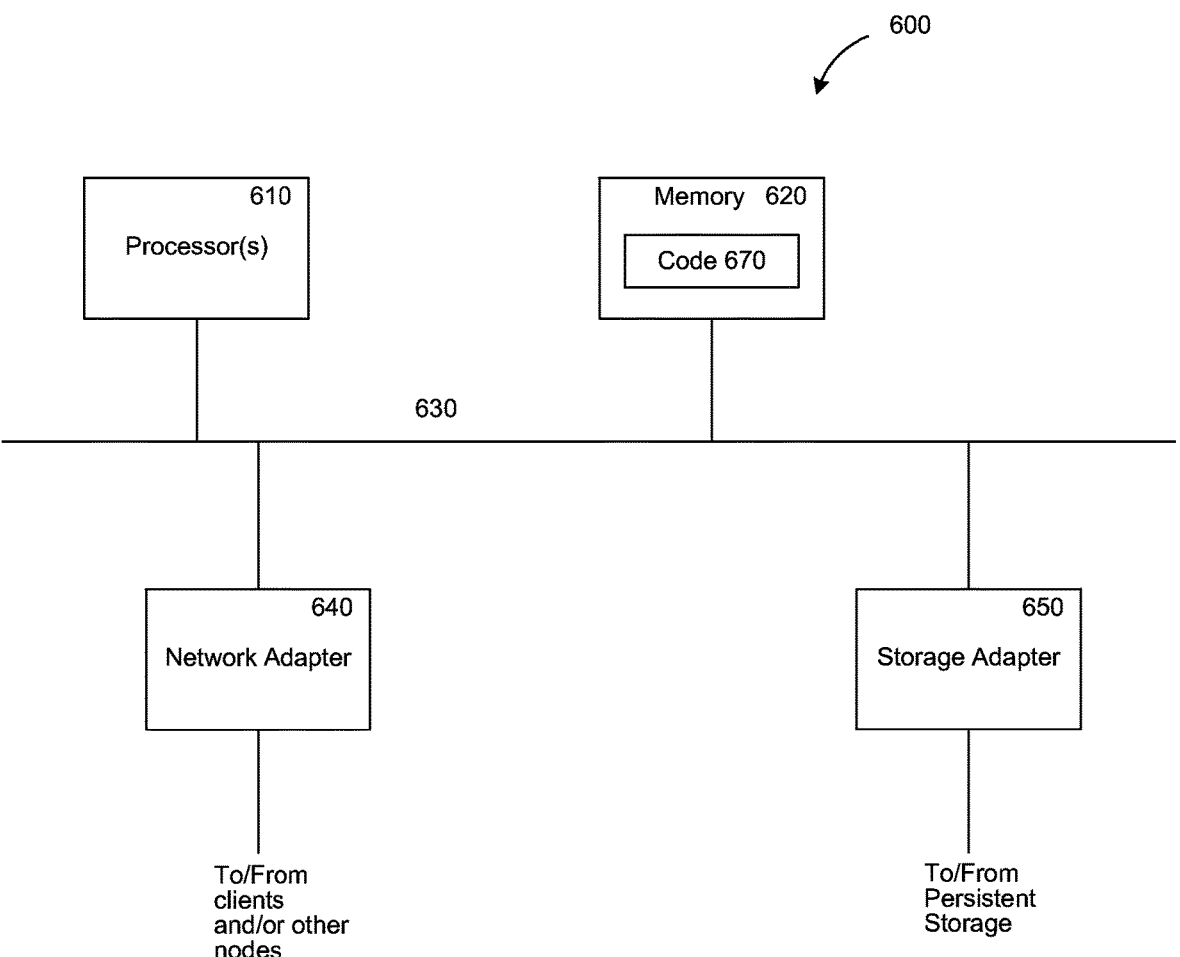
FIG. 6 is a block diagram of an example of a computing device, which may represent one or more computing devices or servers described herein, in accordance with various embodiments.

FIG. 6 is a block diagram of an example of a computing device 600, which may represent one or more computing devices or servers described herein, in accordance with various embodiments. The computing device 600 can be one or more computing devices that implement the messaging system 200 of FIG. 2 or methods and processes described in this disclosure. The computing device 600 includes one or more processors 610 and memory 620 coupled to an interconnect 630. The interconnect 630 shown in FIG. 6 is an abstraction that represents any one or more separate physical buses, point-to-point connections, or both, connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1494 bus, also called "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application-specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification.

The invention claimed is:

1. A smartphone comprising at least one processor, at least one camera, at least one machine-readable storage medium, and software or firmware stored in the at least one machine-readable storage medium, the software or firmware including a text messaging application, wherein the at least one processor is programmed via the software or firmware to:

monitor a video feed from the at least one camera to detect a facial profile of an operating user when a messaging interface of the text messaging application is actively being used;

match the detected facial profile against a known facial profile utilizing a facial recognition process to verify an identity of the operating user;

determine a plurality of human expressions of the operating user based on the video feed and an expression recognition process;

associate each human expression of the plurality of human expressions with a contextual tag to generate a plurality of contextual tags;

generate a user profile in a user profile database based on the plurality of human expressions and the plurality of contextual tags;

determine a current activity for the smartphone;

associate the determined current activity for the smartphone with one of the plurality of contextual tags; and update the user profile in the user profile database based on the association.

2. The smartphone of claim 1 wherein the at least one processor is further programmed to present a targeted advertisement to the operating user on the messaging interface.

3. The smartphone of claim 2 wherein the at least one processor is further programmed to present the targeted advertisement to the operating user on the messaging interface based on an identity of the operating user.

4. The smartphone of claim 2 wherein the at least one processor is further configured to receive an expression trigger condition associated with the targeted advertisement, and to present the targeted advertisement to the operating user on the messaging interface in response to determining a current contextual tag based on a current human expression corresponds to the expression trigger condition.

5. The smartphone of claim 4 wherein the at least one processor is further programmed to select the targeted advertisement from a plurality of options based on the current contextual tag.

6. The smartphone of claim 1 wherein the at least one processor is further programmed to determine a targeted advertisement to display to the operating user on the messaging interface based on the user profile in the user profile database.

* * * * *